United States Patent [19]
Honda et al.

[11] Patent Number: 6,139,161
[45] Date of Patent: Oct. 31, 2000

[54] SURFACE ILLUMINATING DEVICE AND AN IMAGE DISPLAY APPARATUS PROVIDED WITH A SURFACE ILLUMINATING DEVICE

[75] Inventors: Tsutomu Honda, Sakai; Masataka Hamada, Osakasayama; Hideki Nagata, Sakai, all of Japan

[73] Assignee: Minolta Co., Ltd., Osaka, Japan

[21] Appl. No.: 09/060,351

[22] Filed: Apr. 15, 1998

[30] Foreign Application Priority Data

Apr. 16, 1997 [JP] Japan ..................................... 9-098997

[51] Int. Cl.[7] ............................. G03B 27/16; F21V 13/12
[52] U.S. Cl. ................................ 362/17; 362/18; 362/31; 362/224; 362/280; 362/323; 362/355
[58] Field of Search .................................. 349/62, 63, 64, 349/65, 67; 362/3, 16–18, 26, 31, 223, 224, 280, 282, 322, 323, 330, 332, 355

[56] References Cited

U.S. PATENT DOCUMENTS

| | | | |
|---|---|---|---|
| 2,347,665 | 5/1944 | Christensen et al. | 362/31 |
| 2,646,637 | 7/1953 | Nierenberg et al. | 362/31 |
| 4,985,809 | 1/1991 | Matsui et al. | 362/31 |
| 5,057,974 | 10/1991 | Mizobe | 362/31 |
| 5,211,470 | 5/1993 | Frost et al. | 362/31 |
| 5,410,454 | 4/1995 | Murase et al. | 362/31 |
| 5,742,367 | 4/1998 | Kozaki | 349/65 |
| 5,801,793 | 9/1998 | Faris et al. | 349/65 |

*Primary Examiner*—Alan Cariaso
*Attorney, Agent, or Firm*—Burns, Doane, Swecker & Mathis, LLP

[57] ABSTRACT

A surface illuminating device is provided with a light source, a light introducing plate lying in a plane passing the light source, a first light diffusing plate arranged on a top surface of the light introducing plate, and a second light diffusing plate arranged on a bottom surface of the light introducing plate. The light introducing plate includes a first section arranged with the first light diffusing plate, and a second section arranged with the second light diffusing plate. The first and second sections each are formed with serrations in a surface opposite to a surface arranged with their respective light diffusing plate.

20 Claims, 16 Drawing Sheets

SURFACE ILLUMINATING DEVICE AND AN IMAGE DISPLAY APPARATUS PROVIDED WITH A SURFACE ILLUMINATING DEVICE

BACKGROUND OF THE INVENTION

This invention relates to a surface illuminating device, and an image display apparatus provided with the same, such as film image reproducing apparatus and a photographed image recognizer.

In recent years, a film image reproducing apparatus and a photographed image recognizer for displaying an image utilizing a liquid crystal display panel or the like have been known. The liquid crystal display panel used in the apparatus of this kind receives illumination light from a backlight source arranged on the rear surface thereof and displays an image having a tone difference utilizing the transmission and cut-off action of the light by liquid crystal molecules aligned by an image signal and random liquid crystal molecules.

Conventionally, as a backlight source has been known a surface illuminating device which is comprised of a rectangular parallelepipedic light introducing plate mounted in a frame having reflecting inner surfaces except the upper and one side surface thereof, a fluorescent tube provided in contact with the one side surface of this light introducing plate and covered with a reflecting surface on the opposite surface, and a diffusing plate provided on the upper surface of the light introducing plate (Japanese Unexamined Utility Model Publication No. 4-40269). This surface illuminating device uniformly introduces light from the fluorescent tube to the diffusion surface by forming a gradation reflecting portion on the bottom surface of the light introducing plate. Accordingly, if the above surface illuminating device capable of emitting uniform illumination light from the front surface thereof is adopted as a backlight for the liquid crystal display panel which is an illumination object, an image can be uniformly displayed on the display panel regardless of its display position.

Further, Japanese Unexamined Patent Publication No. 7-159720 discloses an optical visually recognizer of eyeglass type in which a backlight source using a single fluorescent tube is held between a pair of opposite LCDs (Liquid Crystal Displays).

With the surface illuminating device disclosed in Japanese Unexamined Utility Model Publication No. 4-40269, if it is applied to a plurality of illumination objects, a plurality of such illuminating devices are required. This stands as a hindrance to the demand of making the apparatus smaller, thus disadvantageously leading to an increase in the cost.

On the other hand, the backlight source disclosed in Japanese Unexamined Utility Model Publication No. 7-159720 simply uses a fluorescent tube and a diffusing plate. This is effective for such a small display surface as to be installed in eyeglasses, but cannot give an effective uniform amount of light to a relatively large illumination object applied to the reproduction and recognition of an image. Further, in the case of the surface illuminating device, there is the problem of large thickness if the backlight source is used while being held between the LCDs.

SUMMARY OF THE INVENTION

It is an object of the present invention to provide a surface illuminating device which has overcome the problems residing in the prior art.

It is another object of the present invention to provide an image display apparatus provided with an inventive surface illuminating device.

According to an aspect of the present invention, a surface illuminating device comprises: a light source which generates a specified amount of light; a light introducing plate lying in a plane passing the light source; a first light diffusing plate arranged on a top surface of the light introducing plate; and a second light diffusing plate arranged on a bottom surface of the light introducing plate.

According to another aspect of the present invention, a film image reproducing apparatus comprises: a surface illuminating device including: a light source which generates a specified amount of light; a light introducing plate lying in a plane passing the light source; a first light diffusing plate arranged on a top surface of the light introducing plate; and a second light diffusing plate arranged on a bottom surface of the light introducing plate; a display panel which is arranged in such a position as to receive light from the first light diffusing plate; a film image pickup device which is arranged in such a position as to receive light from the second light diffusing plate, and picks up an image on a film using the light from the second light diffusing plate; and an image generator which displays an image picked up by the film image pickup device on the display panel.

According to another aspect of the present invention, an image recognizer for use with a photographing apparatus, comprises: a surface illuminating device including: a light source which generates a specified amount of light; a light introducing plate lying in a plane passing the light source; a first light diffusing plate arranged on a top surface of the light introducing plate; and a second light diffusing plate arranged on a bottom surface of the light introducing plate; a first display panel which is arranged in such a position as to receive light from the first light diffusing plate; a second display panel which is arranged in such a position as to receive light from the second light diffusing plate; and an image generator which displays an image photographed by the photographing apparatus on the first and second display panels.

According to another aspect of the present invention, an illuminating method comprising the steps of: entering light from a light source to a light introducing plate having a first surface facing in a first direction and a second surface facing in a second direction opposite to the first direction; and sending out the light from the first and second surfaces of the light introducing plate while diffusing the light.

These and other objects, features and advantages of the present invention will become more apparent upon a reading of the following detailed description and accompanying drawings.

DETAILED DESCRIPTION OF THE PREFERRED EMBODIMENTS OF THE INVENTION

A film image reproducing apparatus according to a first embodiment of the invention will be described with reference to FIGS. 1 to 8C, the film image reproducing apparatus being provided with an inventive surface illuminating device.

Figure 1:
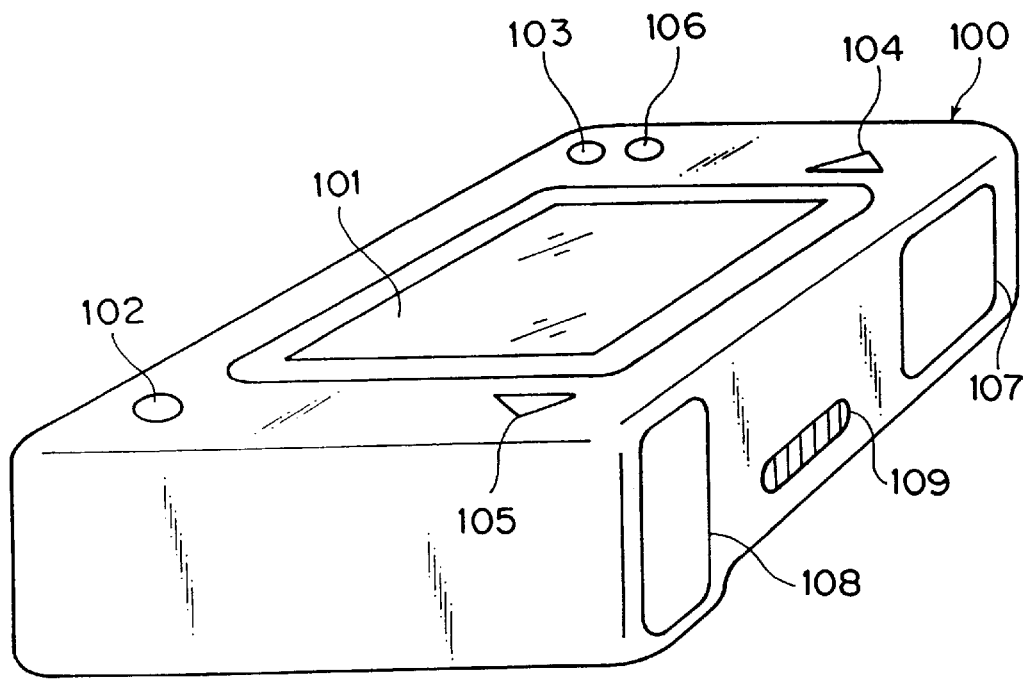
FIG. 1 is a perspective view showing a film image reproducing apparatus according to a first embodiment of the invention.

FIG. 1 is a perspective view showing an external construction of a film image reproducing apparatus. A film used in this embodiment is in accordance with the advanced photo-system (APS). At one end with respect to the widthwise direction of the film, a magnetic track in which magnetic data is recordable is formed in the longitudinal direction of the film, so that photographic information (frame data) can be so recorded as to correspond to each exposure frame. A cartridge for containing this film also has a construction in accordance with the APS. A film type information representing the type of the film contained is recorded in a specified position on an outer surface of the cartridge, and an indicator which makes the state of the contained film (unexposed, exposed (undeveloped), developed, etc.) distinguishable is formed on the bottom end surface of the cartridge.

The film image reproducing apparatus is provided with a liquid crystal display panel (hereinafter, "LCD") 101, a main switch 102, a data display switch 103, a feed switch 104, a rewind switch 105, and an eject switch 106, etc. on the front surface of an apparatus main body 100 and with a cartridge lid 107 on the bottom surface thereof.

The LCD 101 displays a frame image recorded in each frame of a film F and displays frame data read from the magnetic track of the film F in accordance with the operation of the data display switch 103. The main switch 102 alternately switches the activation and deactivation of the entire apparatus each time it is pressed. The data display switch 103 alternately designates the LCD 101 to display or not to display the data each time it is pressed. The feed switch 104 feeds the film F by one frame, whereas the rewind switch 105 rewinds the film F by one frame. The eject switch 106 opens and closes the cartridge lid 107, thereby enabling a cartridge K to be inserted into and removed from a cartridge chamber provided inside the apparatus main body 100.

The apparatus main body 100 is further provided with an opening lid 108 for a battery chamber and an external terminal 109 for an interface for transmitting the frame image data read from the film F and the frame data to an external monitor and an external equipment connected via a communication cable.

Figure 2:
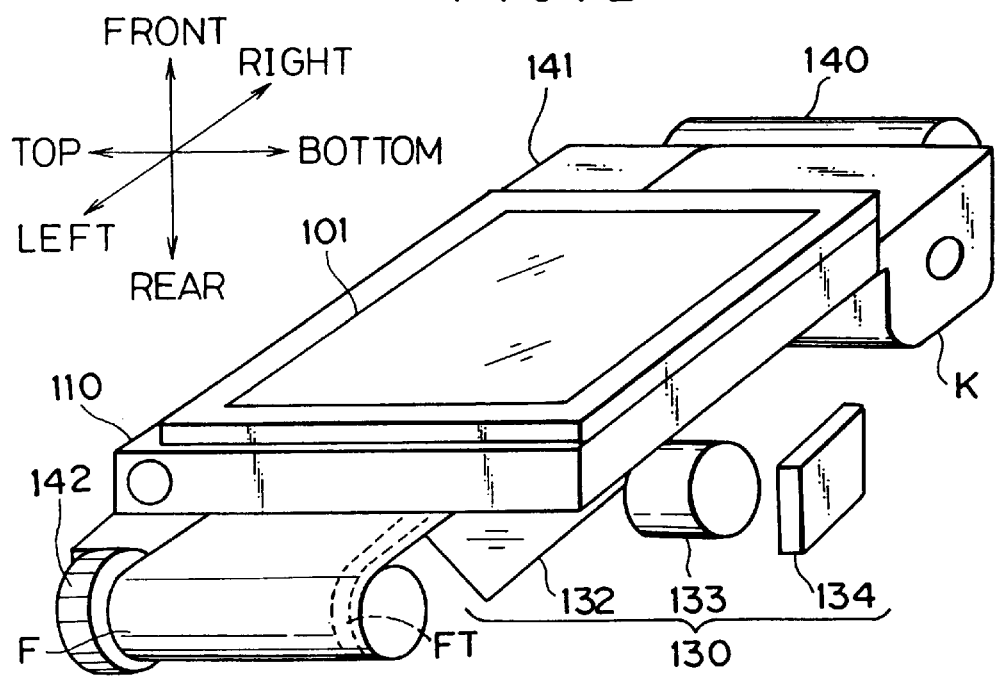
FIG. 2 is a perspective view showing an internal construction of the film image reproducing apparatus.
Figure 3:
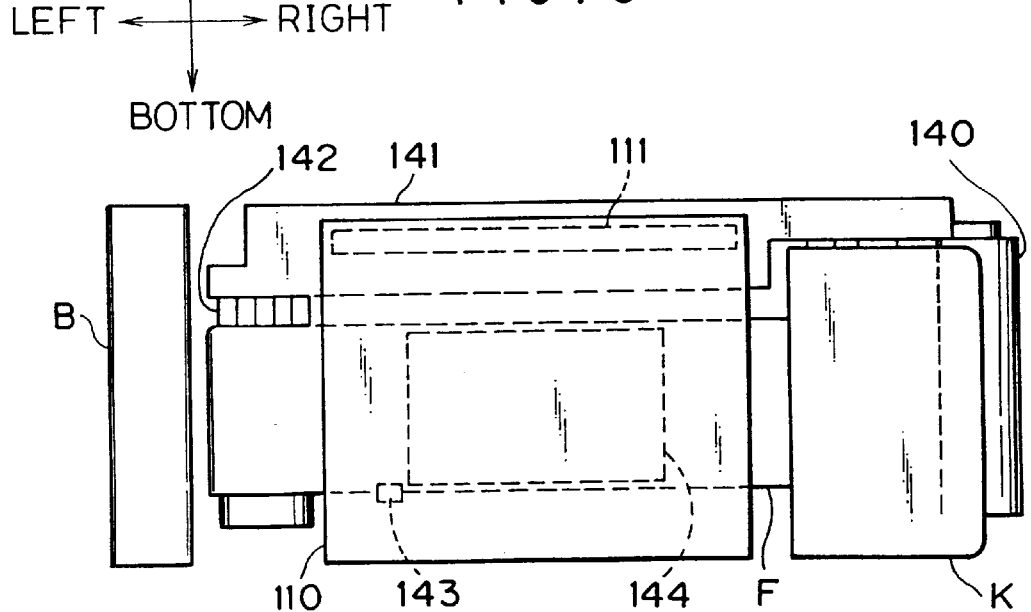
FIG. 3 is a front view of the internal construction of FIG. 2.

FIGS. 2 and 3 are a perspective view and a front view showing an internal construction of the film image reproducing apparatus shown in FIG. 1. The apparatus main body 100 is provided with the LCD 101 on its front surface and an inventive dual surface illuminating device 110 placed on the rear surface of the LCD 101. A feed path for the film F is formed right behind the dual surface illuminating device 110.

The dual surface illuminating device 110 is substantially in the form of a rectangular parallelepiped, and emits illumination light from both front and rear surfaces thereof.

An image pickup unit 130 is arranged at the rear side of the dual surface illuminating device 110 so as to focus a light image, which is light emitted from the rear surface of the dual surface illuminating device 110 and having passed the film F, on an image sensing device 134 via a focusing lens 133 after reflecting it backward by a mirror 132 provided in an intermediate position of a light path.

The image sensing device 134 is such that a plurality of photoelectric conversion elements such as CCDs (Charge Coupled Devices) are arranged in a two-dimensional manner, and is adapted to receive a frame image which is light image having passed the film F to obtain an electrical signal corresponding to an amount of received light. An image signal of the frame image is obtained as a planar set of pixel signals obtained by the respective photoelectric conversion elements.

A motor 140 acts to feed the film F, and a torque transmitting device 141 selectively engages a drive shaft of the motor 140 with an inner spool or a take-up spool of the cartridge K. A battery B supplies a power to the respective parts of the apparatus.

A magnetic head 143 is arranged in a position opposite to a magnetic track FT of the film F so as to pick up the frame data magnetically recorded in the magnetic track FT as an electrical signal. The magnetic head 143 is provided downstream from a reading position 144 of a frame image with respect to a film rewinding direction, and reads the magnetic data of the corresponding frame while the frame corresponding to the frame image to be displayed is fed beyond the reading position 144. The film F is then rewound to position the corresponding frame in the reading position 144. The feed of the film F is controlled by detecting the passage of the perforations of the film F by an unillustrated photosensor or the like and by monitoring a drive signal of the motor 140 or an unillustrated rotary encoder coupled with the motor 140 or the like.

The reading position 144 has a size which is equal to or slightly smaller than that of the dual surface illuminating device 110 when viewed from above and is located substantially in the center position of the apparatus main body 100 when viewed from above. It should be noted that the magnetic head 143 may be provided upstream from the reading position 144 and the magnetic head may be read while the frame to be displayed is directly fed to the reading position 144.

Figure 4:
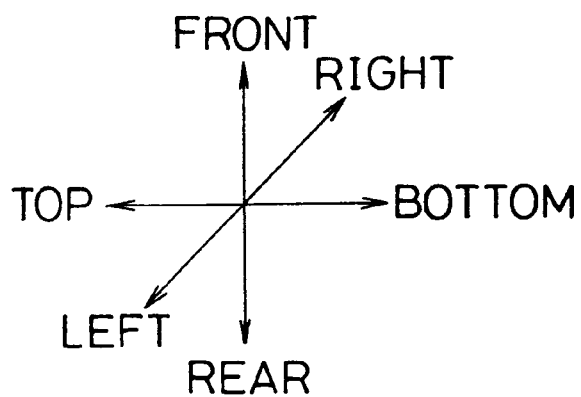
FIG. 4 is a perspective view in section of an inventive dual surface illuminating device.
Figure 4:
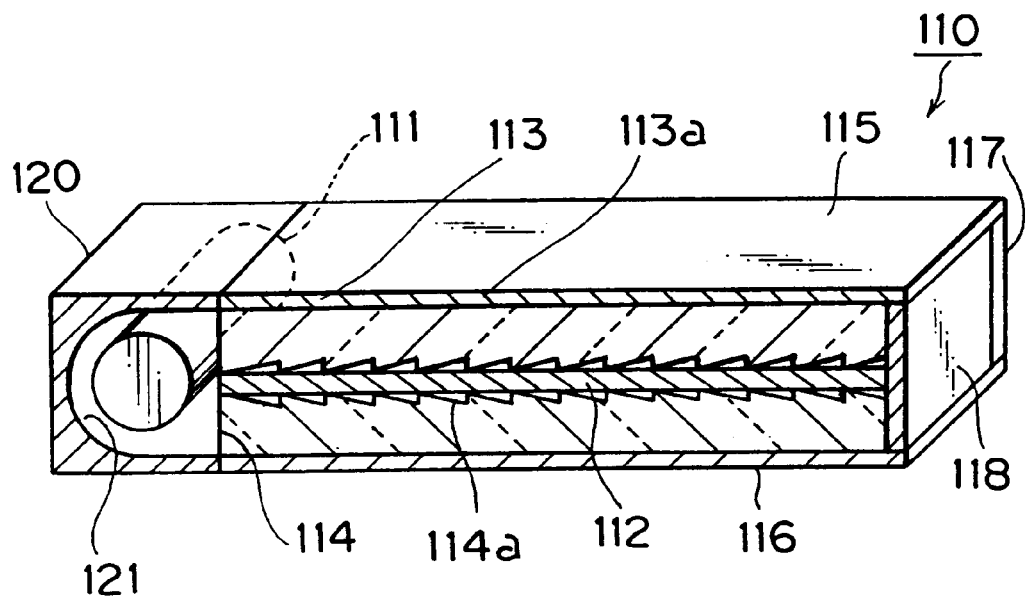

FIG. 4 is a perspective view in section of the dual surface illuminating device 110. The dual surface illuminating device 110 includes a fluorescent tube 111 as a linear light source provided on one side surface of its rectangular parallelepipedic shape, a horizontal dual surface reflector 112 which is divided into upper and rear surfaces by a plane including a center axis of the fluorescent tube 111, light introducing plates 113, 114 arranged on the opposite surfaces of the dual surface reflector 112, diffusing plates 115, 116 arranged on the outer surfaces of the light introducing plates 113, 114, and reflectors 117, 118 and a third reflector disposed opposite to reflector 117 which are so provided as to enclose the side surfaces. The third reflector disposed opposite to the reflector 117 is not shown in FIG. 4.

A reflecting frame 120 elongates in parallel with the fluorescent tube 111 and is formed in one side surface thereof with a curved portion having a U-shaped cross section. A U-shaped surface 121 on the front surface of the curved portion is planished so as to reflect a light. The fluorescent tube 111 is electrically connected and mechanically supported by an unillustrated support member, for example, at its left and right ends so as to be located on the center line of the U-shape. Accordingly, out of the light emitted from the fluorescent tube 111, the light reflected toward the reflecting frame 120 is reflected by the U-shaped surface 121 and effectively introduced to the light introducing plates 113, 114.

On the opposite surfaces of the light introducing plates 113, 114 are formed serrated portions 113a, 114a, in which a multitude of steps of triangular waves are formed in the transverse direction of FIG. 4. In each step, a pseudo linear light source having a light amount substantially equal to that of the diffusing plates 115, 116 is formed. By doing this, substantially uniform light is incident on the entire diffusing surfaces of the diffusing plates 115, 116. Light propagating in the lateral and backward directions is reflected by the inner surfaces of the reflectors 117, 118 and the third reflector disposed opposite to reflector 117, thereby effectively being introduced toward the diffusing plates 115, 116. Although reflector 117 and the third opposing reflector are provided on the side surfaces of the dual surface illuminating device 110 in this embodiment, these side surfaces may not necessarily be reflectors since an amount of the reflected light in the transverse direction is small.

The front surfaces of the diffusing plates 115, 116 are so finished as to transmit the light while diffusing it or are so formed as to be opaque milky white as a whole, so that more uniform light can be emitted from the outer surface by effectively diffusing the incident light.

Figure 5:
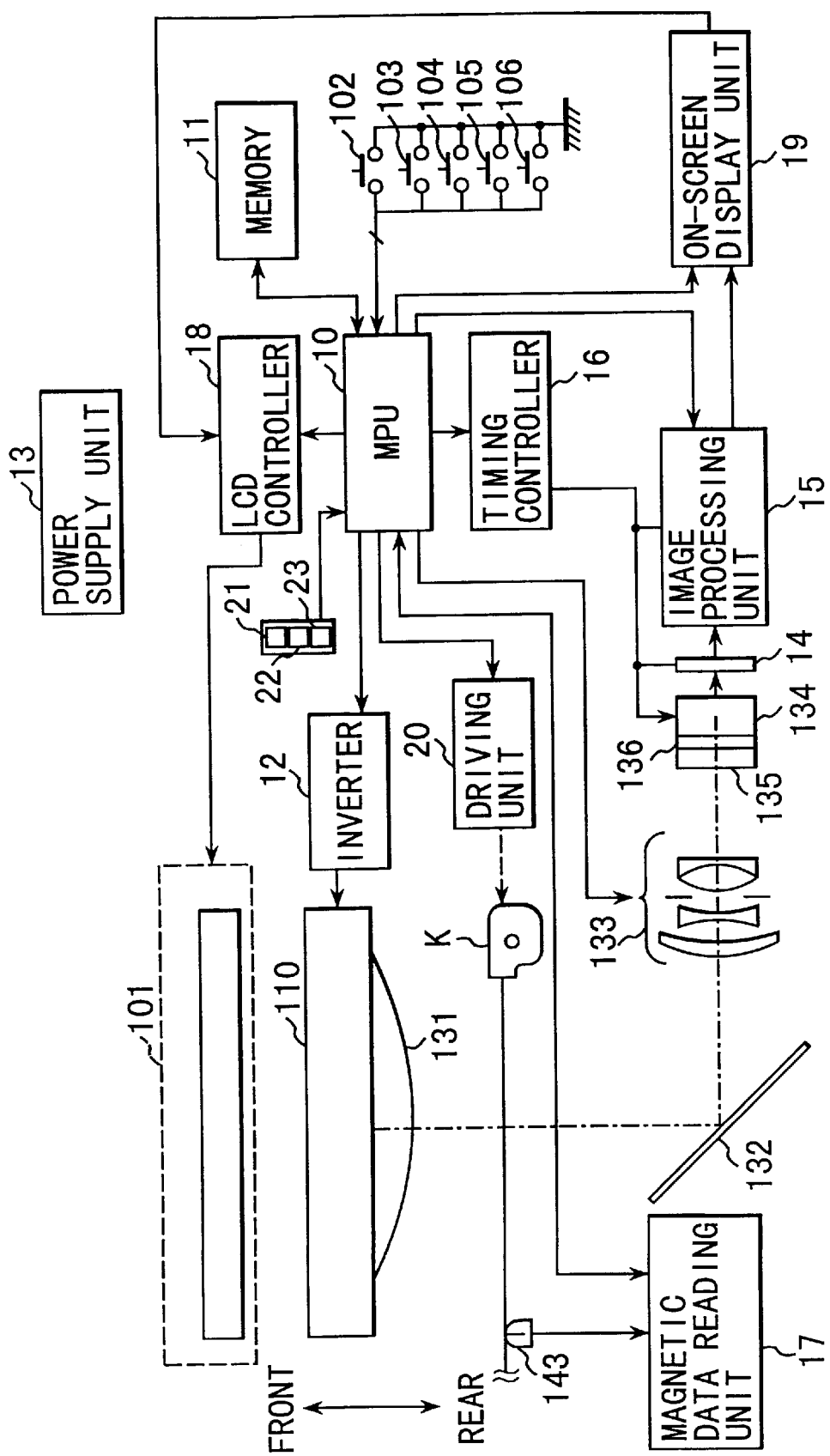
FIG. 5 is a block diagram showing a control system of the film image reproducing apparatus.

FIG. 5 is a block diagram showing a control system of the film image reproducing apparatus. In FIG. 5, a MPU (microprocessor unit) 10 centrally controls operations of the film image reproducing apparatus, and includes a memory 11 including a ROM in which a control program is written and a RAM for temporarily storing processed data.

The dual surface illuminating device 110 is connected with an inverter 12. The inverter 12 converts a direct current voltage supplied from a power supply unit 13 having the battery B into an alternating current voltage and supplies the converted voltage to the fluorescent tube 11 of the dual surface illuminating device 110 so as to make the fluorescent tube 111 luminous. At the rear side of the dual surface illuminating device 110 is provided the image pickup unit 130 for picking up a frame image of the film F.

The image pickup unit 130 is provided with the image sensing device 134, and filters 135, 136 provided on the front surface of the image sensing device 134. The filter 135 is an IR-cut filter for removing infrared rays from the incident light, whereas the filter 136 is an optical low pass filter for removing unnecessary high frequency components. The image pickup unit 130 is also provided with a condenser lens 131 provided opposite to the rear surface of the dual surface illuminating device 110, a mirror 132 for changing the optical axis at right angles, and a focusing lens 133 provided in front of the image sensing device 134. The condenser lens 131 converges the light image emitted from the dual surface illuminating device 110 and having passed the film F so as to conform to the size of the surface of the focusing lens 133, and ensures a desired luminance.

The frame image picked up by the image pickup unit 130 is introduced to an image processing unit 15 via a correlative double sampling (CDS) circuit 14. The CDS circuit 14 applies a correlative double sampling to the pixel signals being transferred in time series from the image sensing device 134 by a timing pulse from a timing controller 16. The image processing unit 15 applies amplification and γ-correction to the inputted signals and then forms image data by A/D converting them. The unit 15 further D/A converts the image data by applying a specified image processing (Y/C separation, WB-correction, tone adjustment, etc.).

A magnetic data reading unit 17 picks up a magnetic data recorded in the magnetic track FT of the film F as an electrical signal via the magnetic head 143, applies a specified signal processing (waveform equalization, waveform shape, etc.) to this electrical signal, and outputs it to the MPU 10.

The LCD 101 can be driven by an LCD controller 18, with which an on-screen display (processing) unit 19 is connected. The LCD controller 18 outputs the pixel signals in correspondence with a multitude of display pixels constituting the display surface of the LCD 101, with the result that the image is displayed on the display surface of the LCD 101. The on-screen display unit 19 selectively generates a display signal for displaying the frame image data inputted from the image processing unit 15 frame by frame and a display signal for displaying the frame data of the film F inputted from the MPU 10, and superimposes the frame data on the frame image to be displayed in the case that both the frame image data and the frame data are to be displayed.

A frame corresponding to a display area of the frame image may also be displayed on the LCD 101. In this case, a switch for designating the display of the frame is provided in a proper position on the front surface of the apparatus main body 100, and a signal representing a frame of a specified size or a frame of a size corresponding to the size of the frame image to be displayed is outputted from the memory 11 to the on-screen display unit 19, so that the frame can be superimposed on the displayed image.

The light image of the frame image focused on the image sensing device 134 is made erect by the mirror 132, but is inverted with respect to the transverse direction. In this embodiment, the transverse direction of the frame image on the film F and that of the frame image to be displayed are made agree with each other in the following manner. For example, a line memory is provided between the image sensing device 134 and the image processing unit 15. The pixel data of each line being transferred from the image sensing device 134 are temporarily written in the line memory, and the stored data are read in a direction opposite from the writing direction (mirror inversion). Alternatively, the image processing unit 15 may be equipped with a frame memory, and the read addresses of the written image data of one frame may be designated in a direction opposite from the one when the image data is written with respect to the transverse direction. Instead of such methods implemented by the reading, the cartridge K may be accommodated in an opposite direction in the cartridge chamber.

A driving unit 20 feeds the film F to the first frame, winds and rewinds the film F by one frame in response to the designation of the feed switch 104 and rewind switch 105, and outputs a drive signal for effecting the rewinding in response to the designation of the eject switch 106 to the motor 140.

In the cartridge chamber of the apparatus main body 100, there are provided a load sensor 21 for discriminating the presence of the cartridge K, a film image reader 22 provided in a position opposite to the film information recording portion on the outer surface of the loaded cartridge K, and a film state reader 23 provided in a position opposite to the film state indicator of the loaded cartridge K. The load sensor 21 can be substituted by the film information reader 22 by discriminating that the film is not loaded when no information has been read.

Figure 6:
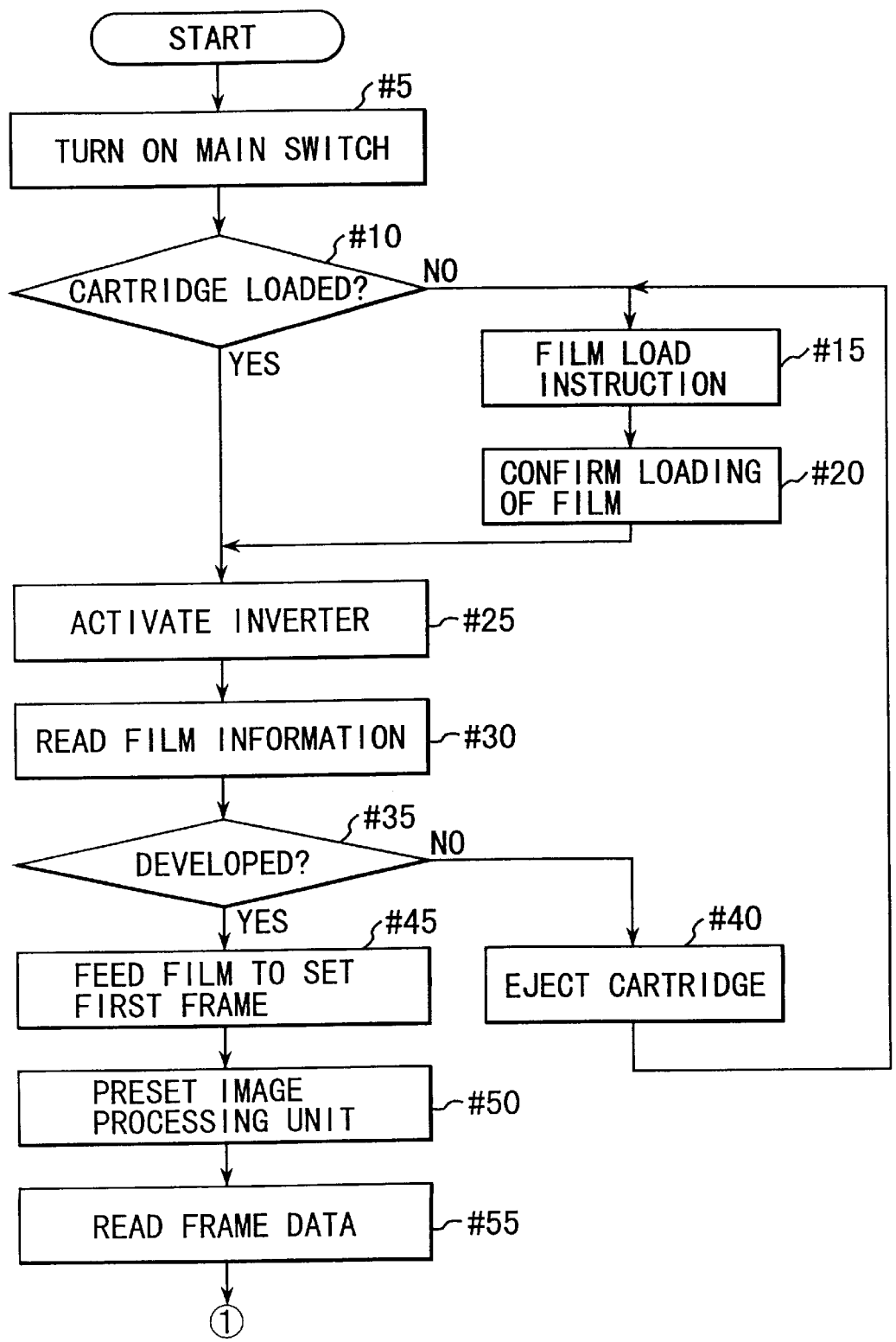
FIGS. 6 and 7 are a flowchart showing a sequence of operations of the film image reproducing apparatus.
Figure 7:
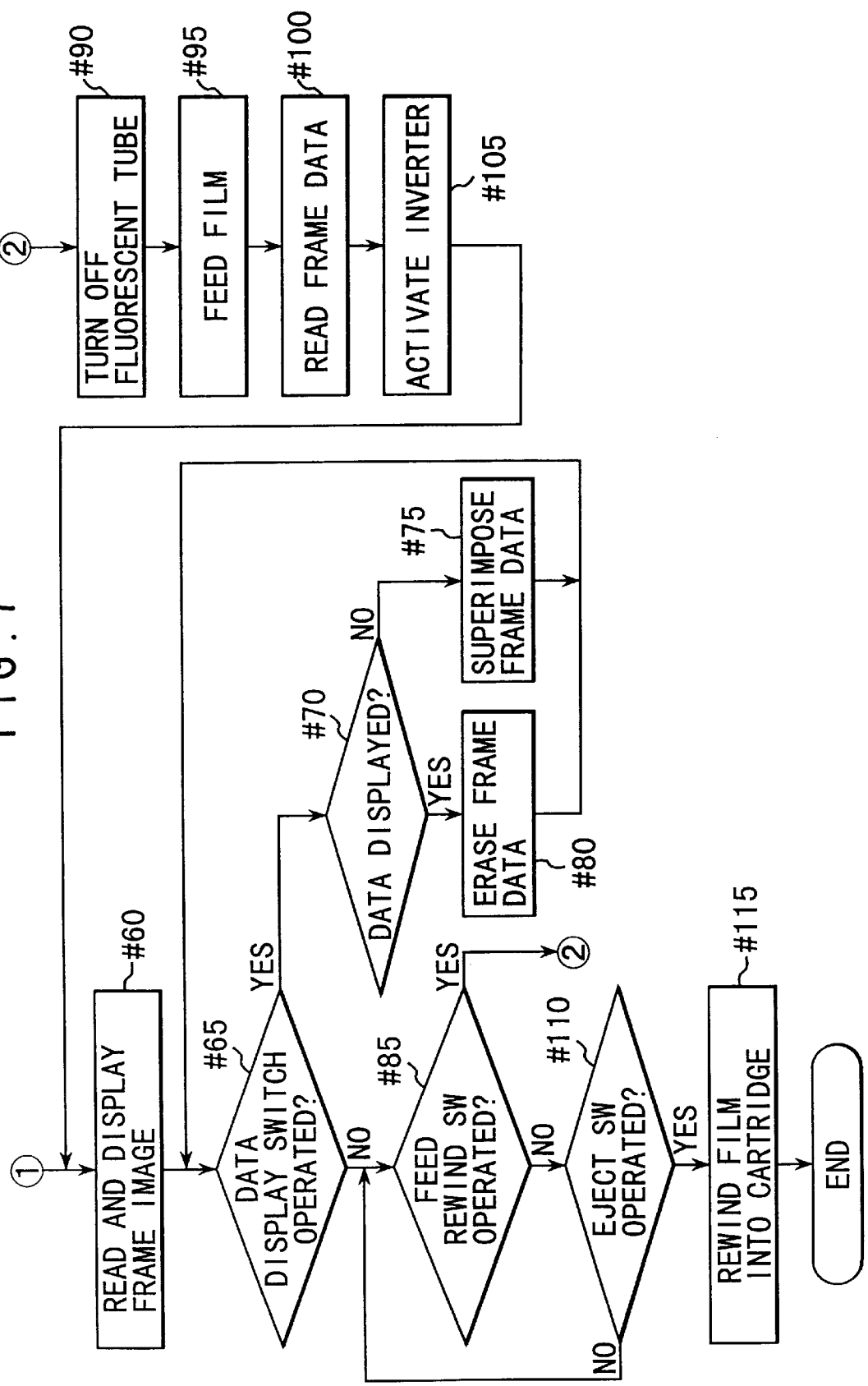

Next, operations of the film image reproducing apparatus will be described with reference to FIGS. 6 and 7. When the main switch 10 is turned on (Step #5), the MPU 10 monitoring the detection signal of the load sensor 21 judges whether the cartridge K is loaded in the cartridge chamber (Step #10). Unless the cartridge K is loaded, a content "Film Load Instruction" is outputted using a separate display member or audio member or the like (Step #15).

If the cartridge K is loaded (YES in Step #10) or if the loading of the cartridge K is confirmed (Step #20), the inverter 12 is activated to turn the dual surface illuminating device 110 on (Step #25). Subsequently, the type data of the contained film F and an information as to whether the film F is developed are read from the cartridge K by the film information reader 22 and the film state reader 23 (Step #30). If the film F is undeveloped (NO in Step #35), the cartridge lid 107 is opened to eject the cartridge K (Step #40) and this routine returns to Step #15.

On the other hand, if the film F is developed (YES in Step #35), the image pickup unit 130 and the image processing unit 15 are activated and the motor 140 is driven to feed the film F to set the first frame in the reading position 144 (Step #45). If the film F is distinguished to be a negative film or a monochromatic film by the film information reader 22, the activated image pickup unit 130 and image processor 15 extracts white balance information, taking advantage of an undeveloped portion of the film F while the first frame is fed to the reading position 144, and the image processing unit 15 is preset based on the obtained information (Step #50).

While the first frame is fed to the reading position 144 (when the first frame temporarily passes the reading position 144, but then rewound), the frame data of the first frame is read via the magnetic head 143 similar to Step #30 (Step #55).

In Step #60, the first frame of the film F is fed to the reading position 144, and the image pickup unit 130 reads the frame image of the first frame using the illumination light from the dual surface illuminating device 110, thereby picking up the frame image. The read frame image is displayed on the LCD 101 after being displayed on the on-screen display unit 19.

Thereafter, it is discriminated whether the data display switch 103 has been operated (Step #65). If the data display switch 103 has been operated, it is discriminated whether the data has already been displayed (Step #70). Unless the data is being displayed, the frame data is superimposed on the frame image being displayed assuming that a data display has been instructed (Step #75) and this routine returns to Step #65. On the other hand, if the data is being displayed, the displayed frame data is erased assuming that a data erasure has been instructed (Step #80) and this routine returns to Step #65.

Unless the data display switch 103 has been operated in Step #65, it is discriminated whether the feed switch 104 or rewind switch 105 has been operated (Step #85). If the feed switch 104 or rewind switch 105 has been operated, the operation of the inverter 12 is interrupted and the fluorescent tube 111 of the dual surface illuminating device 110 is turned off (Step #90). If the feed switch 104 is discriminated to have been operated in Step #85, the previous frame is fed to the reading position 144 (Step #95). When the feed switch 104 is operated in this feed instruction, the frame data of the next frame image is read during the feed (Step #100). Since the already read frame data is stored in the memory 11 in the case that the film F is rewound to the previous frame, this stored frame data is used by being read.

Upon the completion of the feed of one frame of the film F, the inverter 12 is activated again to turn the fluorescent tube 111 of the dual surface illuminating device 110 on (Step #105). Since the fluorescent tube 111 is turned off during the feed of the film F, the battery B can be prevented from being consumed during this time and a disturbance in the output image due to the unstable operation of the image pickup unit 130 resulting from a large load current to the motor 140 can be prevented. If a power supply to the image pickup unit 130 is interrupted at this time, the consumption of the battery B can be further prevented.

On the other hand, if neither the feed switch 104 nor rewind switch 105 is discriminated to have been operated in Step #85, it is discriminated whether the eject switch 106 has been operated (Step #110). If the eject switch 106 has been operated, the motor 140 is driven and the film F is rewound into the cartridge K. Upon the completion of the rewinding, the cartridge lid 107 is opened (Step #115) and this routine ends. Unless the eject switch 106 is operated, this routine returns to Step #85.

Although the dual surface illuminating device 110 is so constructed as to simultaneously illuminate both the LCD 101 and the film F as shown in FIG. 4, it may selectively illuminate either one of the LCD 101 and the film F.

Figure 8A:
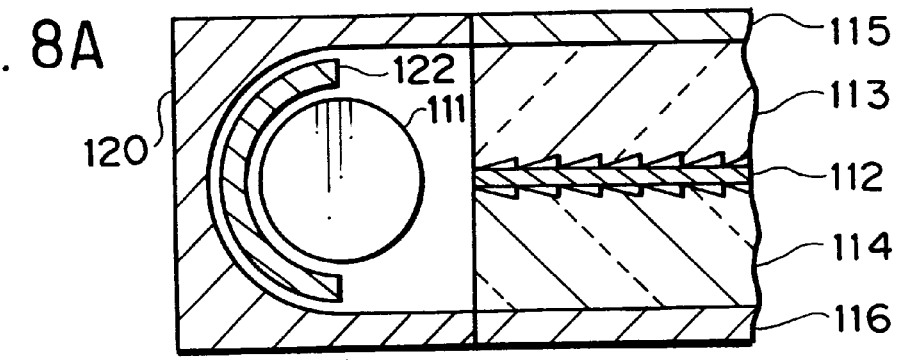
FIGS. 8A, 8B and 8C are diagrams showing another inventive dual surface illuminating device, and illustrating a state where both an LCD and a film are simultaneously illuminated, a state where only the LCD is illuminated, and a state where only the film is illuminated, respectively.
Figure 8B:
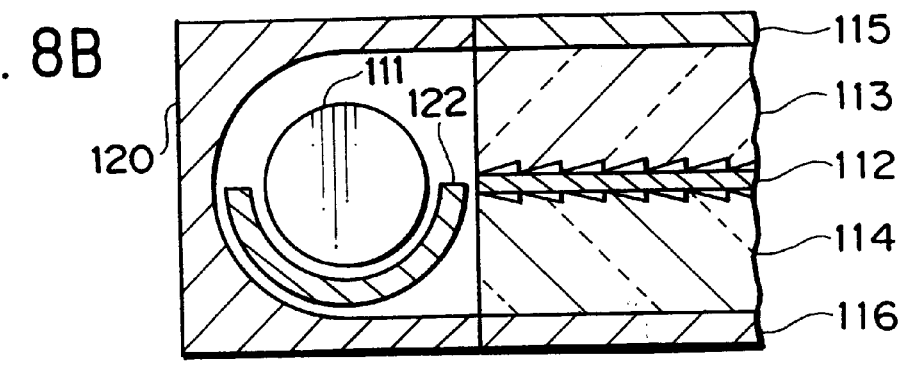
Figure 8C:
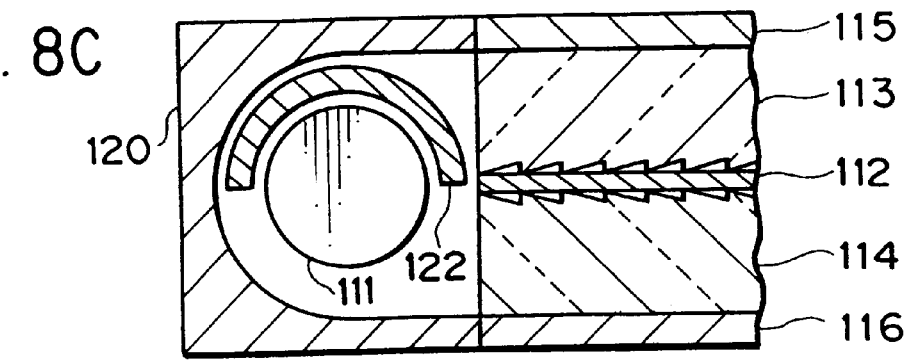

FIGS. 8A to 8C are side views partly in section showing a part of the fluorescent tube of another dual surface illuminating device which enables selective illumination, wherein FIG. 8A shows a state where both the LCD and the film are simultaneously illuminated, FIG. 8B shows a state where only the LCD is illuminated and FIG. 8C shows a state where only the film is illuminated. Elements identified by the same reference numerals as in FIG. 4 are the same as or similar to the elements of FIG. 4.

A reflector 122 has a semicylindrical shape and is movably arranged along the luminous surface of the fluorescent tube 111. The inner surface of the reflector 122 is planished so as to reflect a light. Alternatively, a cylindrical member made of a transparent member may be adopted and planishing may be applied to half the area of the outer surface of this cylindrical member or a member having an inner surface planished may be adhered.

When the reflector 122 is in its rotational position of FIG. 8B, the light to the light introducing plate 114 is blocked by the reflector 122 and the illumination light from the fluorescent tube 111 is introduced only to the light introducing plate 113. Accordingly, only the LCD 101 is illuminated. On the other hand, when the reflector 122 is in its rotational position of FIG. 8C, the light to the light introducing plate 113 is blocked by the reflector 122 and the illumination light from the fluorescent tube 111 is introduced only to the light introducing plate 114. Accordingly, only the film F is illuminated. Since the illumination range is made selectively switchable, a fluorescent tube of lower power consumption type can be used as the fluorescent tube 111, thereby realizing a power saving effect. The reflector 122 is suitably rotated to the positions of FIGS. 8B and 8C in accordance with a command from the MPU 10 using an unillustrated motor in synchronism with the display of the frame image, the image pickup operation of the frame image, etc.

Specifically, in the case that the dual surface illuminating device 110 according to the second embodiment is adopted, the reflector 122 is set in the position of FIG. 8C for the image pickup operation when the frame image of the film F is picked up by the image pickup unit 130, and the picked frame image is written in a frame memory (or field memory) provided in the image processing unit 15. When the picked frame image is displayed by being repeatedly read from the frame memory or the like, the reflector 122 may be rotated to the position of FIG. 8B.

Since the fluorescent tube 111 faces both light introducing plates 113, 114 when the reflector 122 is in the rotational position of FIG. 8A, the illumination light can be introduced to both light introducing plates 113, 114, with the result that both the LCD 101 and the film F can be illuminated.

Next, a film image reproducing apparatus according to a second embodiment of the invention will be described with reference to FIGS. 9 to 14.

Figure 9:
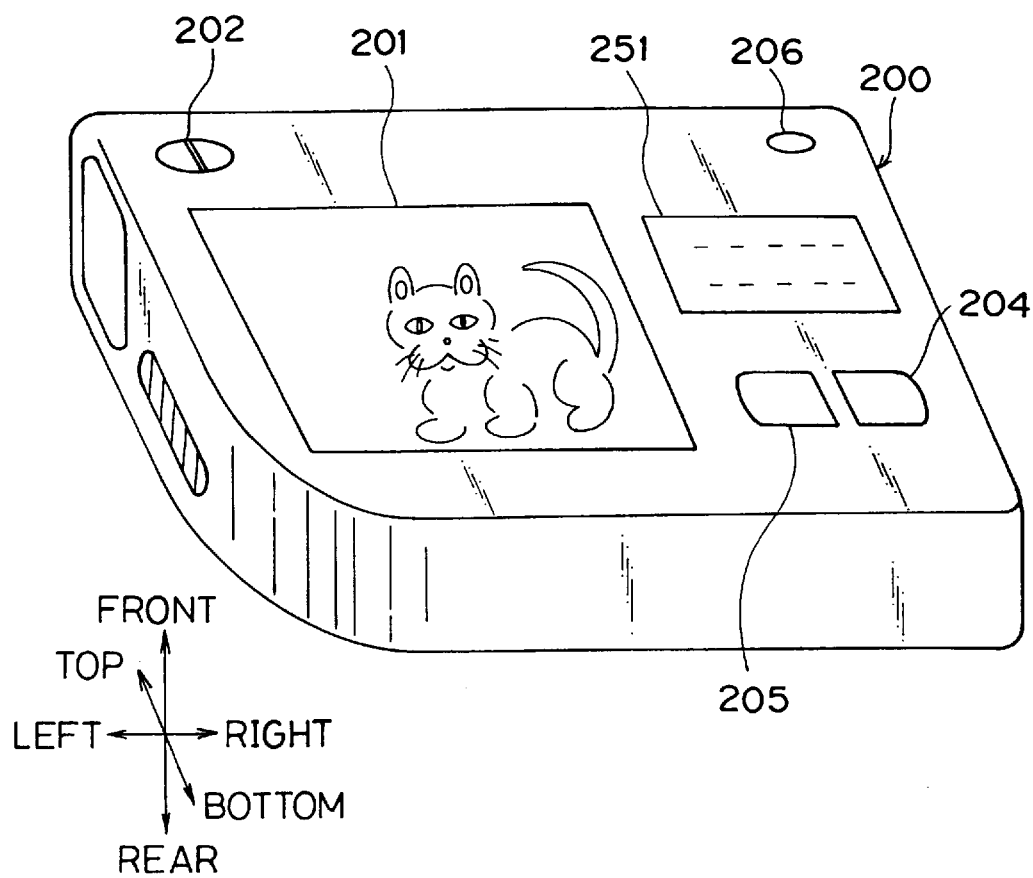
FIG. 9 is a perspective view showing a film image reproducing apparatus according to a second embodiment of the invention.
Figure 10A:
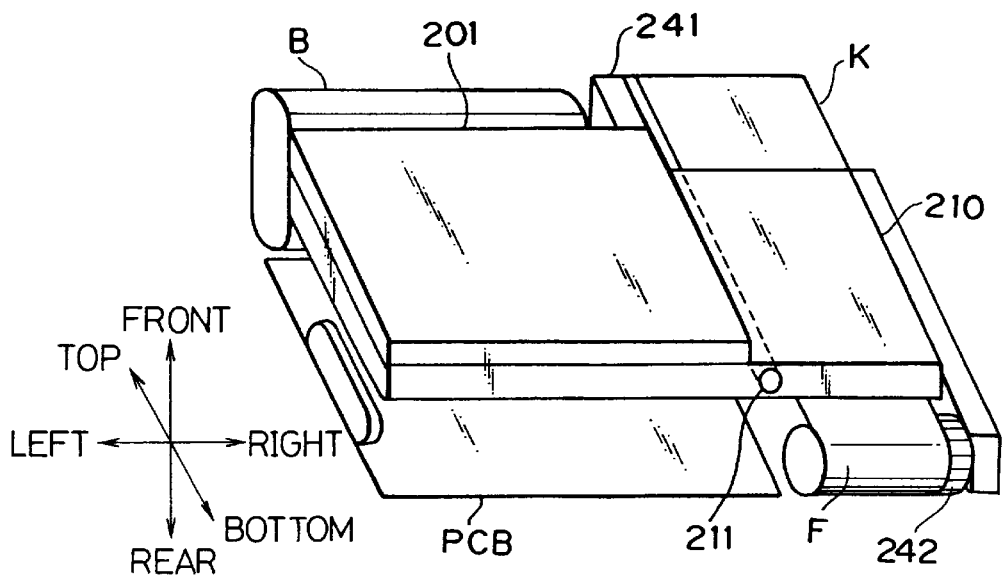
FIG. 10A is a perspective view showing an internal construction of the film image reproducing apparatus of FIG. 9.
Figure 10B:
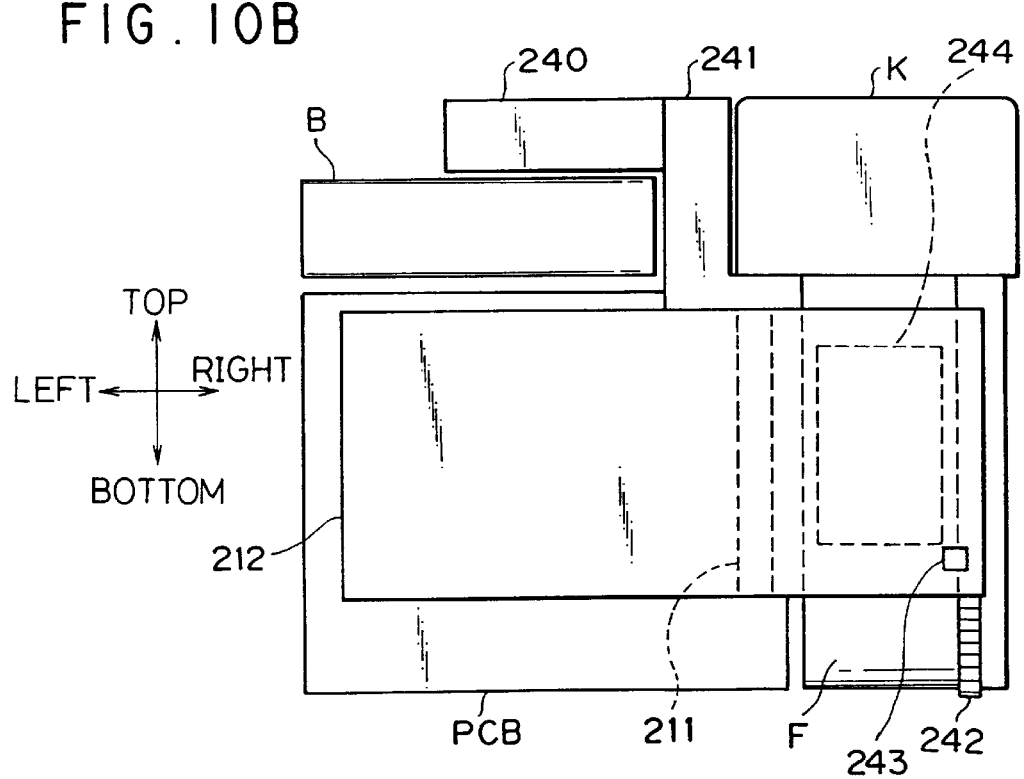
FIG. 10B is a front view of the internal construction of FIG. 10A.

FIG. 9 is a perspective view of a film image reproducing apparatus 200, and FIGS. 10A and 10B are a perspective view and a front view showing an internal construction of the film image reproducing apparatus. The film image reproducing apparatus 200 is constructed such that an inventive dual surface illuminating device 210 is provided therein along the transverse direction of the apparatus 200 and an LCD 201 for displaying a frame image is provided on the left side of the front surface thereof. An LCD 251 provided on the right side of the front surface is adapted to display frame data.

A fluorescent tube 211 is so arranged as to extent in forward and backward directions in a position substantially in the center, but slightly toward the right of the dual surface illuminating device 210. On the right side of the fluorescent tube 211 and on the rear surface of the dual surface illuminating device 210 is defined a film reading position 244 so that film F dispensed from a cartridge K and fed to a take-up spool 242 passes this reading position 244. A variety of switches 202, 204 to 206 correspond to the switches 102, 104 to 106 of FIG. 1 showing the first embodiment, respectively. Similarly, elements from a motor 240 to a magnetic head 243 correspond to those from the motor 140 to the magnetic head 143.

Figure 11A:
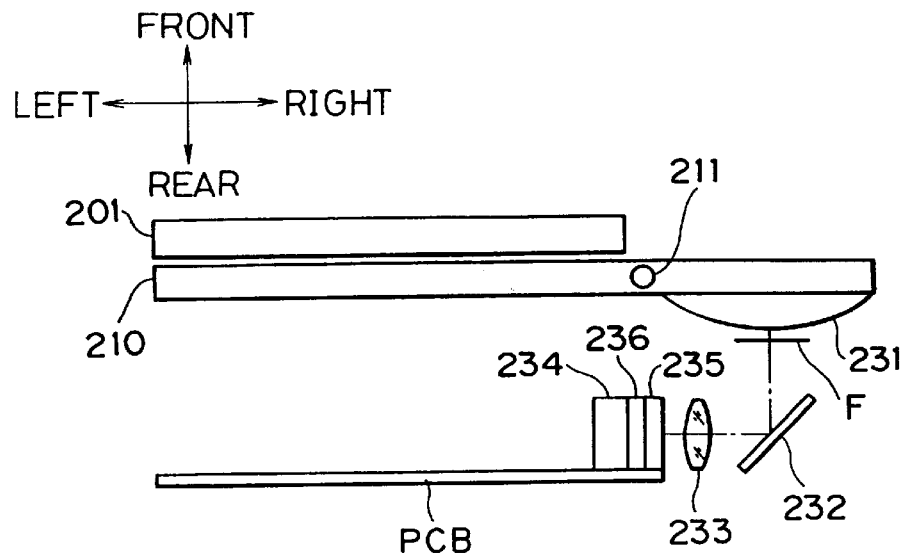
FIG. 11A is a bottom view showing an arrangement of an inventive dual surface illuminating device and an image pickup in the film image reproducing apparatus of FIG. 9.
Figure 11B:
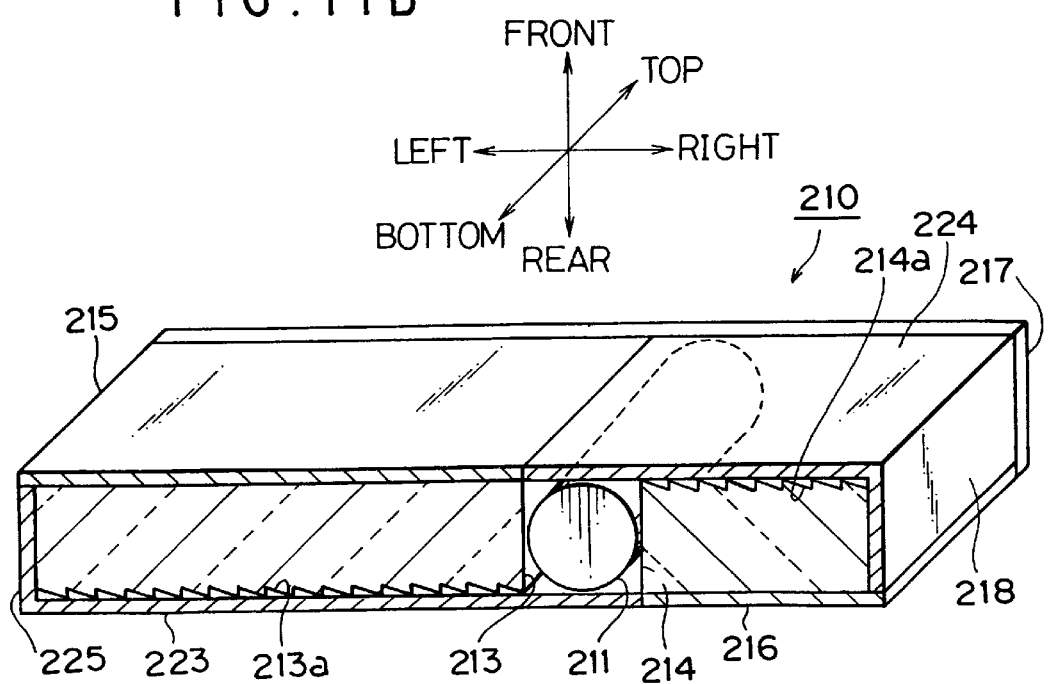
FIG. 11B is a perspective view in section showing a construction of the dual surface illuminating device.

FIG. 11A is a side view showing an arrangement of the dual surface illuminating device 210 and an image pickup unit 230, and FIG. 11B is a perspective view vertically in section showing a construction of the dual surface illuminating device 210.

As shown in FIG. 11A, a circuit board PCB on which the respective circuits for controlling the operation of this apparatus and an image sensing device 234 oriented toward the right are provided on the left and right sides behind an apparatus main body 200, respectively. On the other hand, a condenser lens 231 is provided opposite to the image sensing device 234 on the rear surface of the dual surface illuminating device 210 and on the right side of the fluorescent tube 211. Between the condenser lens 231 and the image sensing device 234 are provided a mirror 232 and a focusing lens 233 for orienting the optical axis of the condenser lens 231 toward the image sensing device 234. Accordingly, the image sensing unit 230 faces a right half (first area) of the rear surface of the dual surface illuminating device 210 and the rear surface of the LCD 201 faces a left half (second area) of the front surface of the dual surface illuminating device 210.

As shown in FIG. 11B, the dual surface illuminating device 210 has a rectangular parallelepipedic shape and is provided internally with the fluorescent tube 211 which is so arranged as to extent in forward and backward directions in the position substantially in the center, but slightly toward the right of the dual surface illuminating device 210, light introducing plates 213, 214 provided on the left and right sides of the fluorescent tube 211, diffusing plates 215, 216 provided on the front sides of the respective light introducing plates 213, 214, and reflectors 223, 224 provided on the rear sides of the respective light introducing plates 213, 214. Further, reflectors 217, 218, 225, and a fourth reflector disposed opposite to reflector 217 are so provided as to enclose outer side surfaces of the dual surface illuminating device 210. It should be noted that the fourth reflector disposed opposite to reflector 217 is not shown in FIG. 11B.

The fluorescent tube 211 is electrically connected and mechanically supported at its front and rear ends similar to the first embodiment. The illumination light from the fluorescent tube 211 toward the left side is introduced toward the light introducing plate 213, whereas the illumination light from the fluorescent tube 211 toward the right side is introduced toward the light introducing plate 214. The light introducing plates 213, 214 have a thickness equal to or slightly larger than the diameter of the fluorescent tube 211. Serrated portions 213a, 214a are formed on the rear surfaces (lower and upper surfaces in FIG. 11B) of the light introducing plates 213, 214, respectively. Thus, substantially uniform light is incident on the diffusing surfaces of the diffusing plates 215, 216.

With the above construction, the LCD 201 can receive the illumination light as a backlight from the left half of the dual surface illuminating device 210 and the condenser lens 231 and the film F can receive the illumination light for the photo graphing from the right half of the dual surface illuminating device 210.

The block diagram of the film image reproducing apparatus 200 according to the second embodiment is substantially the same as the one shown in FIG. 5 except that a second LCD controller for controlling the LCD 251 is separately provided. The frame data read by the magnetic head 243 during the feed of the film F is, after being send to the MPU 10 of FIG. 5, is introduced not to the on-screen display unit 19, but to the second LCD controller. Accordingly, the frame data is constantly displayed on the LCD 251.

Next, operations of the film image reproducing apparatus according to the second embodiment will be described. This operation is basically performed in accordance with the flowchart shown in FIGS. 6 and 7. Hereafter, only different points are described. Since the LCD 251 is in charge of the display of the frame data in the second embodiment, Steps #60 to #80 of the flowchart shown in FIG. 7 are unnecessary.

Although the dual surface illuminating device 210 is so constructed as to simultaneously illuminate both the rear surface of the LCD 201 and the film F as shown in FIGS. 11A and 11B, it may selectively illuminate either one of them.

Figure 12A:
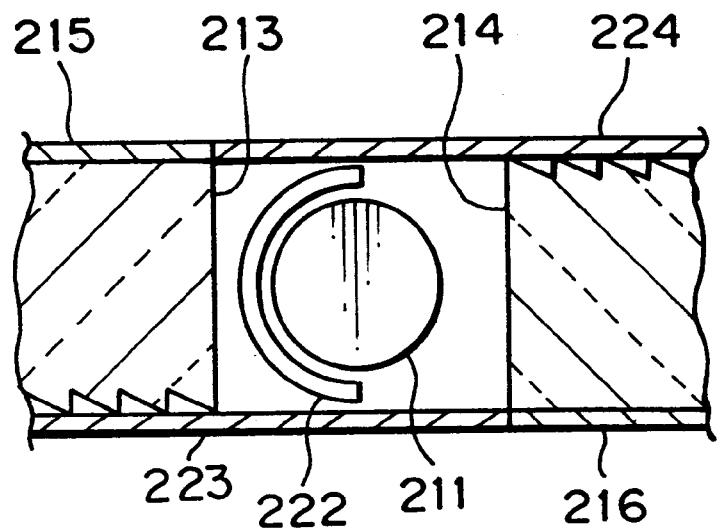
FIGS. 12A and 12B are diagrams showing another inventive dual surface illuminating device, and illustrating a state where only a film is illuminated and a state where only an LCD is illuminated, respectively.
Figure 12B:
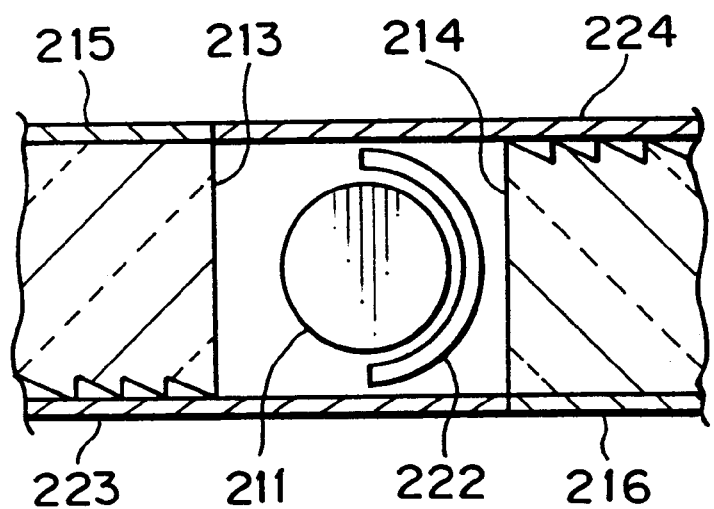

FIGS. 12A and 12B are side views partly in section showing another inventive dual surface illuminating device which is capable of selective illumination, wherein FIG. 12A shows a state where only the film is illuminated and FIG. 12B shows a state where only the LCD is illuminated.

A reflector 222 has a semicylindrical shape and is movably arranged along the luminous surface of the fluorescent tube 211. The inner surface of the reflector 222 is planished so as to reflect light. Alternatively, a cylindrical member made of a transparent member may be adopted and planishing may be applied to half the area of the outer surface of this cylindrical member or a member having an inner surface planished may be adhered. When the reflector 222 is in its rotational position of FIG. 12A, the light to the light introducing plate 213 is blocked by the reflector 222 and the illumination light from the fluorescent tube 211 is introduced only to the light introducing plate 214. Accordingly, only the film F is illuminated. On the other hand, when the reflector 222 is in its rotational position of FIG. 12B, the light to the light introducing plate 214 is blocked by the reflector 222 and the illumination light from the fluorescent tube 211 is introduced only to the light introducing plate 213. Accordingly, only the LCD 201 is illuminated. Since the illumination range is made selectively switchable, a fluorescent tube of lower power consumption type can be used as the fluorescent tube 211, thereby realizing a power saving effect. The reflector 222 is suitably rotated to the positions of FIGS. 12A and 12B in accordance with a command from the MPU 10 using an unillustrated motor in synchronism with the display of the frame image, the image pickup operation of the frame image, etc.

In the case that this dual surface illuminating device 210 is adopted, the reflector 222 is set in the position of FIG. 12A for the image pickup operation when the frame image of the film F is picked up by the image pickup unit 230, and the picked frame image is written in a frame memory (or field memory) provided in an image processing unit (see the image processing unit 15 in FIG. 5). When the picked frame image is displayed by being repeatedly read from the frame memory or the like, the reflector 222 may be rotated to the position of FIG. 12B.

Figure 13A:
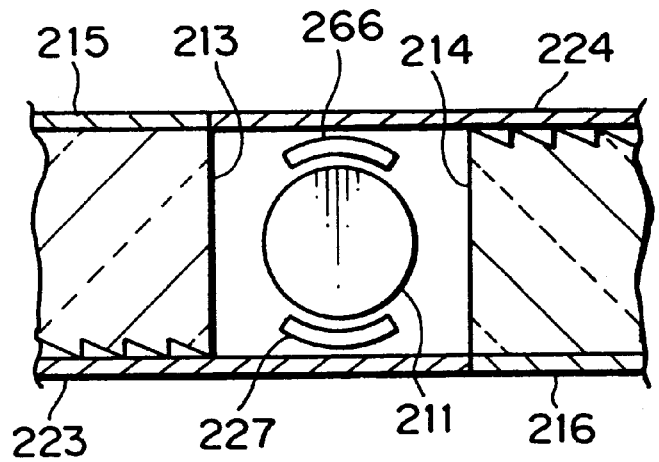
FIGS. 13A, 13B and 13C are diagrams showing yet another inventive dual surface illuminating device, and illustrating a state where both the LCD and the film are simultaneously illuminated, a state where only the LCD is illuminated, and a state where only the film is illuminated, respectively.
Figure 13B:
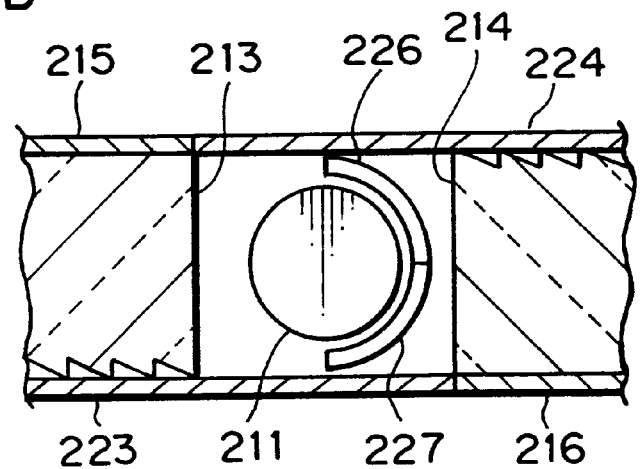
Figure 13C:
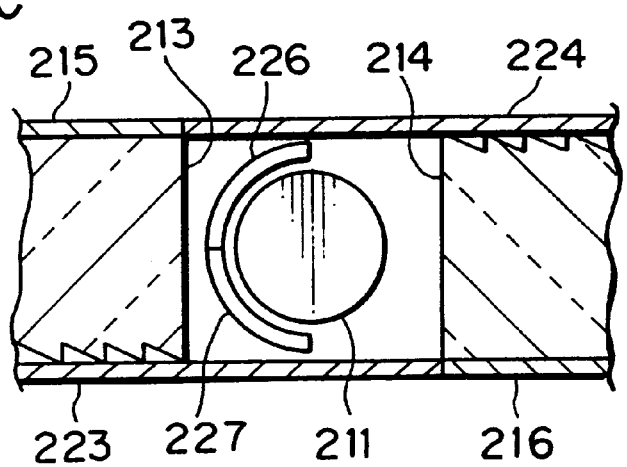

FIGS. 13A, 13B and 13C are side views partly in section showing still another inventive dual surface illuminating device, wherein FIG. 13A shows a state where both the LCD and the film are simultaneously illuminated, FIG. 13B shows a state where only the LCD is illuminated and FIG. 13C shows a state where only the film is illuminated.

A reflector of this dual surface illuminating device includes first and second reflectors 226, 227 which are two of four equally divided and elongated parts of a cylinder, and are movably arranged along the luminous surface of the fluorescent tube 211. The inner surfaces of the first and second reflectors 226, 227 are planished so as to reflect a light. Although the first and second reflectors 226, 227 having an identical shape are adopted, two cylindrical members made of transparent members may be concentrically provided, and the inner surfaces thereof may be planished only in their areas corresponding to 90°.

When the first and second reflectors 226, 227 are in their rotational positions of FIG. 13B, the light to the light introducing plate 214 is blocked thereby and the illumination light from the fluorescent tube 211 is introduced only to the light introducing plate 213. Accordingly, only the LCD 201 is illuminated. On the other hand, when the reflectors 226, 227 are in their rotational positions of FIG. 13C, the light to the light introducing plate 213 is blocked thereby and the illumination light from the fluorescent tube 211 is introduced only to the light introducing plate 214. Accordingly, only the film F is illuminated. Since the illumination range is made selectively switchable, a fluorescent tube of lower power consumption type can be used as the fluorescent tube 211, thereby realizing a power saving effect. The reflectors 226, 227 may synchronously be rotated to the positions of FIGS. 13B and 13C by 90° in forward and reverse directions, i.e., opposite directions with respect to the base position of FIG. 13A. The reflectors 226, 227 are suitably rotated to these positions in accordance with a command from the MPU 10 using an unillustrated motor in synchronism with the display of the frame image on the LCD 210, the image pickup operation of the frame image, etc.

In the case of using the dual surface illuminating device 210 of FIGS. 13A, 13B and 13C, the reflectors 226, 227 are set in the positions of FIG. 13C when the frame image of the film F is picked up by the image pickup unit 230, and the picked frame image is written in a frame memory (or field memory) provided in an image processing unit (see the image processing unit 15 in FIG. 5). When the picked frame image is displayed by being repeatedly read from the frame memory or the like, the reflectors 226, 227 may be rotated to the positions of FIG. 13B.

Since the fluorescent tube 211 faces both light introducing plates 213, 214 when the first and second reflectors 226, 227 are in their rotational positions of FIG. 13A, the illumination light can be introduced to both light introducing plates 213, 214, with the result that both the LCD 201 and the film F can be illuminated.

Figure 14:
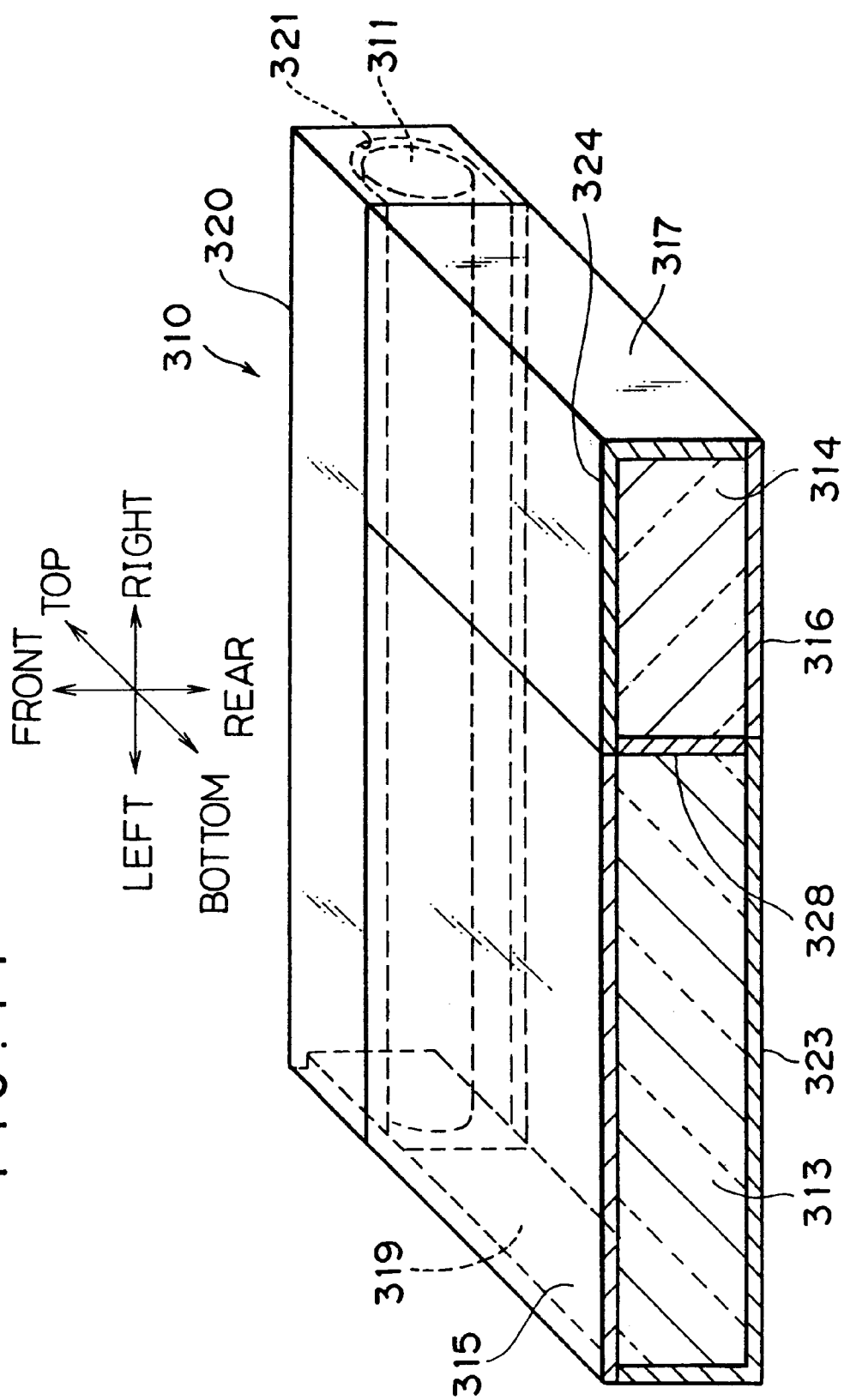
FIG. 14 is a perspective view showing still another inventive dual surface illuminating device.

FIG. 14 is a perspective view showing a further inventive dual surface illuminating device. The dual surface illuminating device 310 has a rectangular parallelepipedic shape and is provided internally with a fluorescent tube 311 provided on its front side, a dual surface reflector 328 which is so arranged as to extent in forward and backward directions in a position substantially in the middle of the longitudinal direction of the fluorescent tube 311, light introducing plates 313, 314 provided on the left and right sides of the dual surface reflector 328, diffusing plates 315, 316 provided on the front sides of the respective light introducing plates 313, 314, and reflectors 323, 324 provided on the rear sides of the respective light introducing plates 313, 314. Further, reflectors 317, 318 and 319 are so provided as to enclose outer side surfaces of the dual surface illuminating device 310. It should be noted that the reflector 218 is not shown in FIG. 14.

The fluorescent tube 311 is electrically connected and mechanically supported at its front and rear ends similar to the first embodiment. The light introducing plates 313, 314 have a thickness equal to or slightly larger than the diameter of the fluorescent tube 311, and first and second areas are defined by the dual surface reflector 328. Although unillustrated, serrated portions similar to the first embodiment are formed on the rear surfaces of the light introducing plates 313, 314.

With the dual surface illuminating device 310, the illumination light emitted from the fluorescent tube 311 and introduced to the light introducing plate 313 illuminates the rear surface of the LCD 201 via the diffusing plate 315, whereas the illumination light emitted from the fluorescent tube 311 and introduced to the light introducing plate 314 illuminates the film F at the rear side via the diffusing plate 316.

Figure 15A:
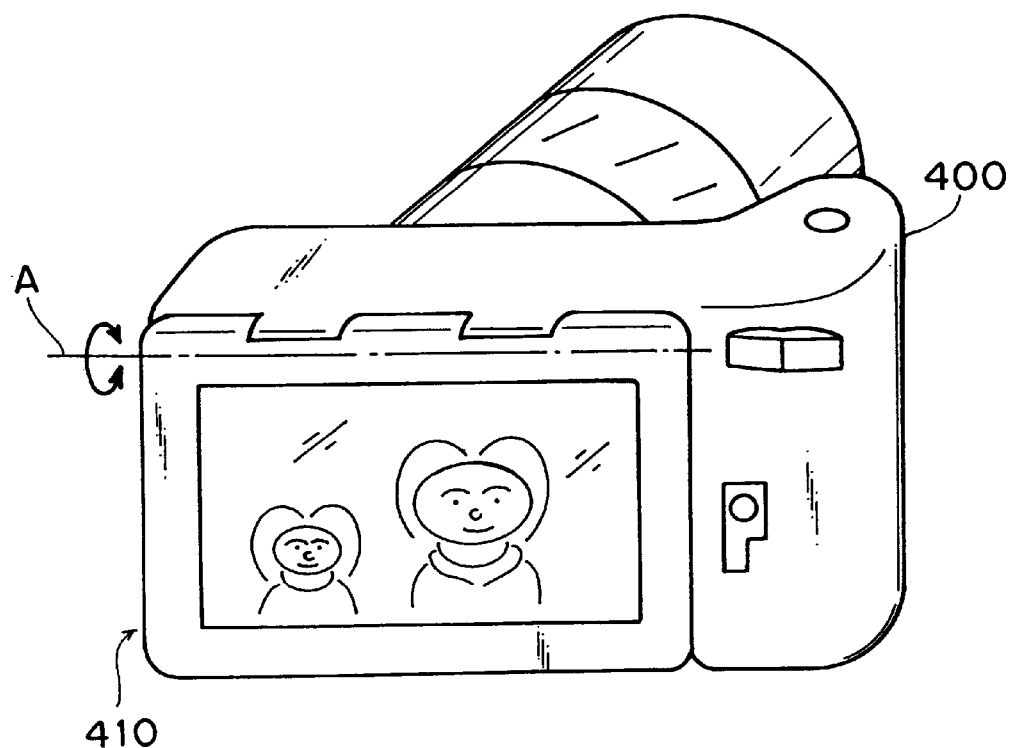
FIG. 15A is a perspective view showing an external configuration of a digital camera capable of recognizing photographed image.
Figure 15B:
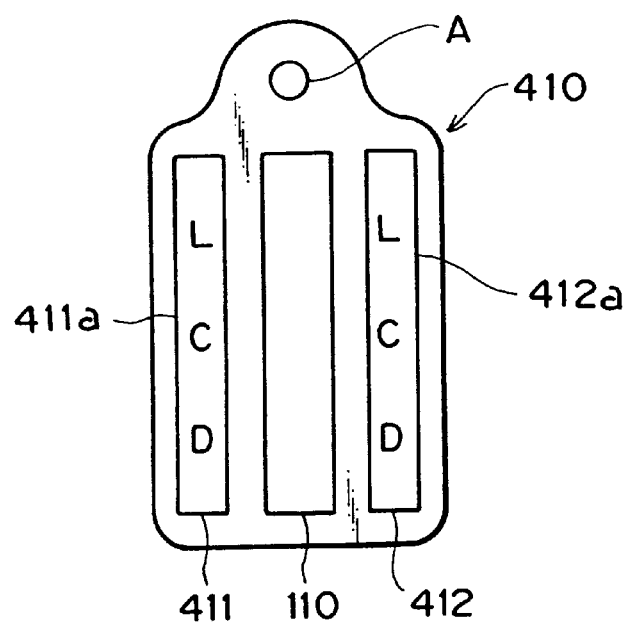
FIG. 15B is a diagram showing an arrangement of a dual surface type viewfinder in the digital camera.

FIGS. 15A and 15B show a digital camera capable of recognizing a photographed image which is provided with the inventive dual surface illuminating device, according to a third embodiment of the invention. FIG. 15A is a perspective view showing an external configuration of the digital camera and FIG. 15B is a diagram showing an arrangement of the digital camera and a dual surface type viewfinder.

The digital camera includes a camera main body 400 and a dual surface type viewfinder 410. The viewfinder 410 is pivotally engaged with the camera main body 400 about a horizontal axis A in an upper portion of the rear surface of the camera main body 400 using a hinge construction or the like. The viewfinder 410 is, as shown in FIG. 15B, provided internally with the dual surface illuminating device 110 having the reflector 122 shown in FIG. 8. Further, LCDs 411, 412 (first and second displays) are arranged at the opposite sides of the dual surface illuminating device 110. The rear surfaces of the LCDs 411, 412 face the front and rear surfaces of the dual surface illuminating device 110, and display surfaces 411a, 412a which are the front surfaces of the LCDs 411, 412 are exposed to the opposite outer surfaces of the viewfinder 410, so that images displayed on the display surfaces 411a, 412a can be viewed.

In the case that the LCDs 411, 412 are arranged in displaced positions, the dual surface illuminating devices 210, 310 shown in FIGS. 11B, 12A and 12B, 13A to 13C, and 14 may be adopted. If the digital camera is not of the switch type, the dual surface illuminating device 110 shown in FIG. 4 may be adopted.

Figure 16A:
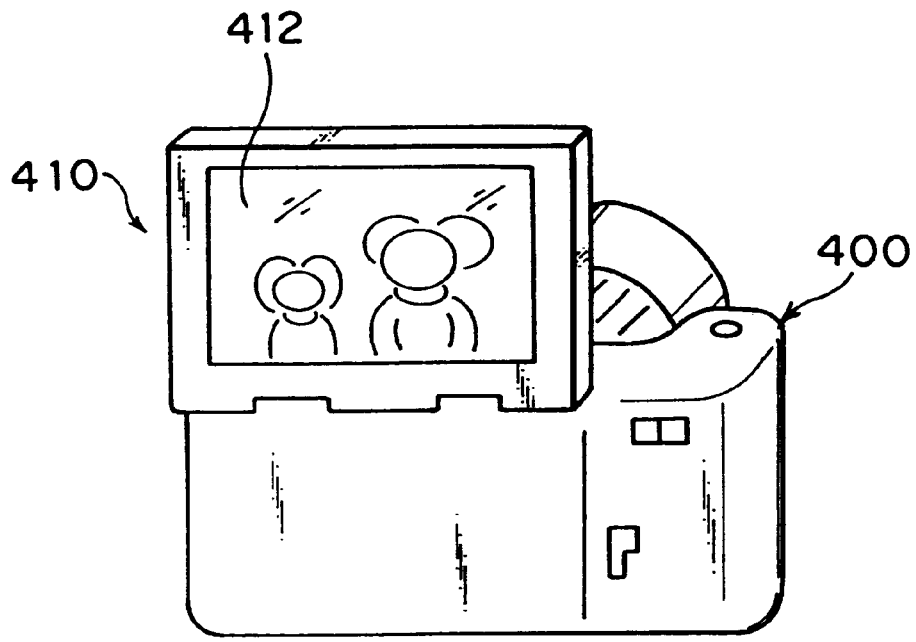
FIG. 16A is a perspective view of the digital camera from a photographer.
Figure 16B:
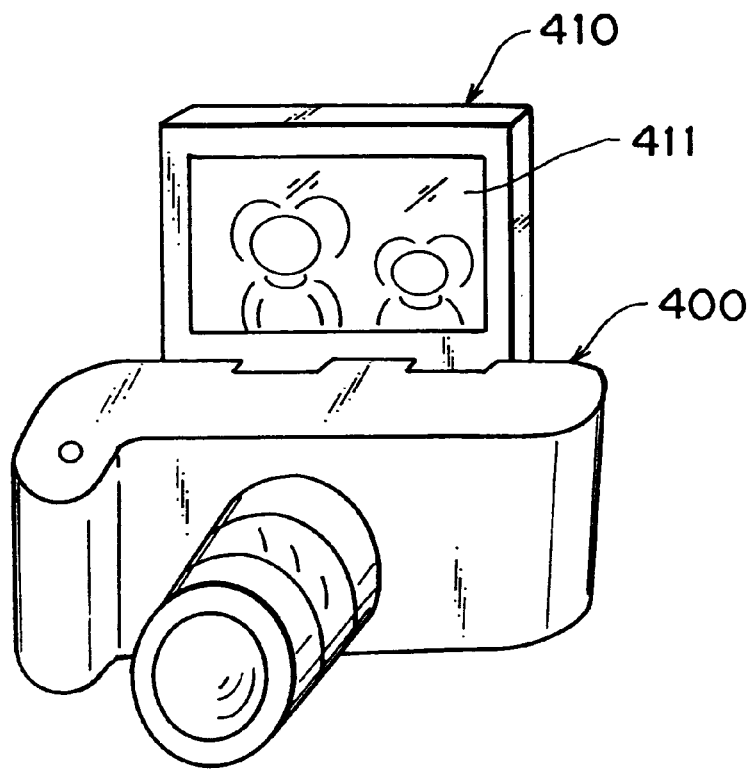
FIG. 16B is a perspective view of the digital camera from an object.

FIGS. 16A and 16B are views showing the digital camera with the viewfinder 410 in its standing position, wherein FIG. 16A is a perspective view viewed from a photographer side and FIG. 16B is a perspective view viewed from an object side. FIG. 15A is a view showing the digital camera from the back with the viewfinder in its laying position.

By providing the LCDs 411, 412 on the opposite surfaces of the viewfinder 410, an image to be photographed can be properly viewed from both the photographer and object sides. In other words, with the viewfinder 410 in its laying position, a photographer can view the image to be photographed by the LCD 411. On the other hand, with the viewfinder 410 in its standing position, the photographer and a person to be photographed can view the image to be photographed by the LCD 412 and by the LCD 411, respectively.

Figure 17:
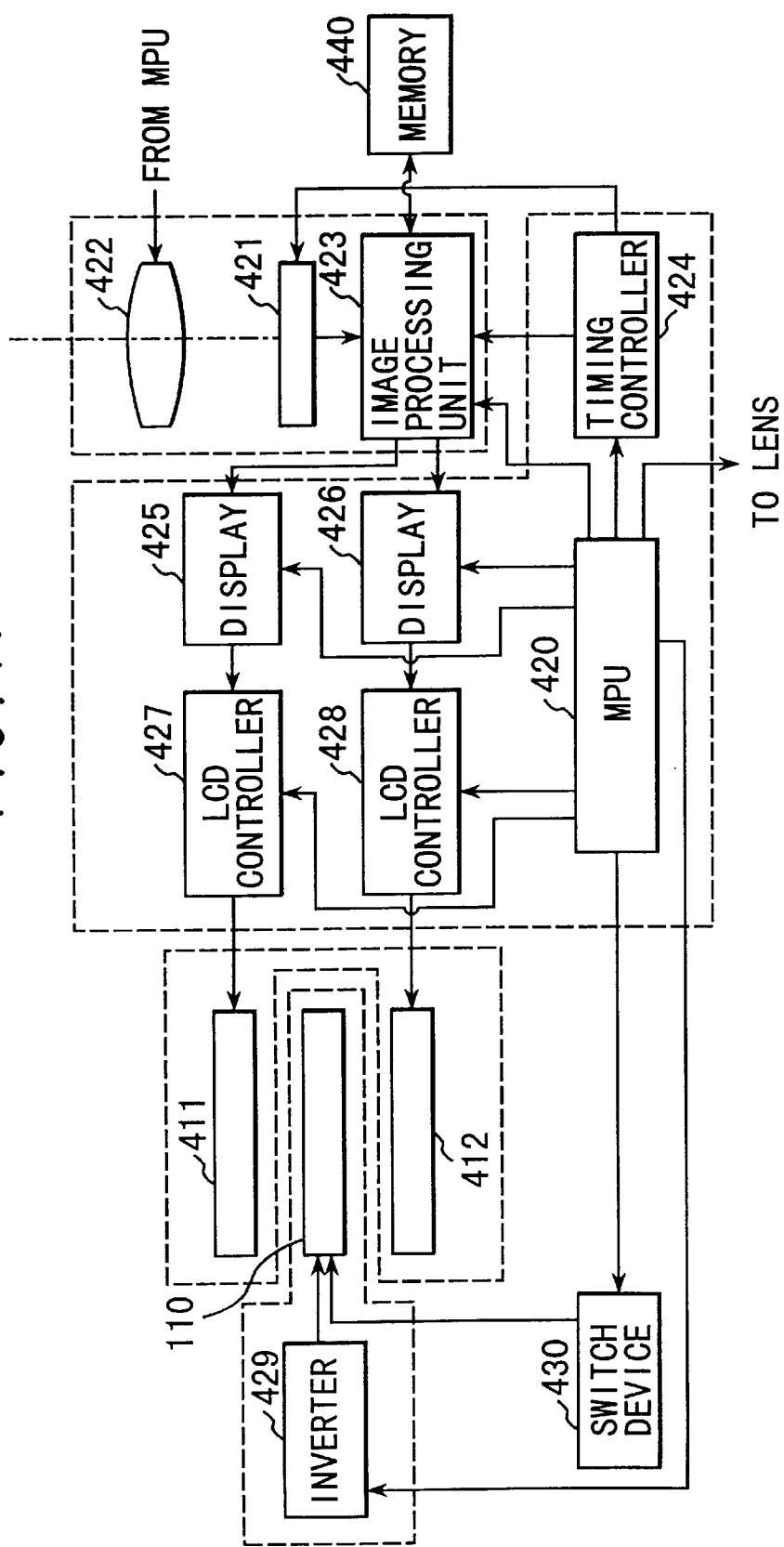
FIG. 17 is a block diagram showing a control system of the digital camera.

FIG. 17 is a block diagram showing a control system of the digital camera. In FIG. 17, an image sensing device 421 is such that CCDs are arrayed in a two-dimensional manner to pick up an object image focused via a taking lens 422. The sensed image data is transferred to an image processing unit 423. The image data is transferred in accordance with a timing pulse from a timing controller 424 in response to a command of an MPU 420.

The image processing unit 423 applies a specified image processing (such as a Y/C separation, WB correction, tone adjustment and image compression) to the transferred image data after applying thereto a specified signal processing (such as signal amplification, offset adjustment and A/D conversion).

The image data processed by the image processing unit 423 is sent to an on-screen display (processing) unit 425 corresponding to the LCD 411 and an on-screen display (processing) unit 426 corresponding to the LCD 412. A memory 440 is an IC memory, a disk or the like detachably loadable into the main body 400 for desirably storing the photographed images of a plurality of frames.

The image processing unit 423 also applies a mirror processing to be described later to the image data for the display which is outputted to the on-screen display units 425, 426 in correspondence with the laying and standing positions of the viewfinder 410 in response to a command from the MPU 420. The image data inputted to the on-screen display units 425, 426 are repeatedly outputted to the LCD 411, 412 by LCD controllers 427, 428 in a specified cycle to be displayed.

An inverter 429 is adapted to turn the fluorescent tube 111 of the dual surface illuminating device 110 on. A switch device 430 is comprised of a motor or the like for switching the rotational position of the reflector 122 of the dual surface illuminating device 110 in response to a command from the MPU 420.

Next, a display operation by the viewfinder 410 is described. When the viewfinder 410 is in its laying position as shown in FIG. 15A, the switch device 430 rotates the reflector 122 in the dual surface illuminating device 110 to the position of FIG. 8C so that only the LCD 411 can be illuminated in accordance with a control signal from the MPU 420. At this time, the image data is sent only to the on-screen display unit 425 from the image processing unit 423. The LCD controller 427 successively reads the image data from the on-screen display unit 425 and displays them on the LCD 411. As a result, as shown in FIG. 15A, the photographed image of the object can be viewed from the photographer side. In this case, the image processing unit 423 does not apply a mirror inversion processing for inverting the photographed image with respect to transverse direction.

In the case that the image is displayed on both LCDs 411, 412 by setting the viewfinder 410 in its standing position, the switch device 430 rotates the reflector 122 in the dual surface illuminating device 110 to the position of FIG. 8A so that the rear surfaces of the respective LCDs 411, 412 can be illuminated in accordance with the control signal from the MPU 420. At this time, the image data of the photographed object is sent from the image processing unit 423 to the on-screen display unit 425, and the image data obtained by applying different mirror inversion processings to the same object image are sent from the image processing unit 423 to the on-screen display unit 426. The image processing unit 423 outputs the image data to the LCD 412 as it is. However, the LCD 412 is so mounted that the vertical direction thereof agrees with that of the actual image in the case of FIG. 16A. Further, the image processing unit 423 applies a mirror inversion processing to the image data to be outputted to the LCD 411 so as to invert the transverse and vertical directions.

Accordingly, the object image is displayed on the LCD 412 so as to be viewed from the photographer side and is displayed on the LCD 411 so as to be viewed from the object side.

The viewfinder 410 is also applicable to an electronic viewfinder (EVF) mounted in a video movie apparatus, a silver-salt camera or the like.

In the foregoing embodiments, the light source is linear. However, it should be noted that the present invention is not limited to the linear light source. It may be appreciated to use a light source of a ball.

As described above, the inventive dual surface illuminating device can be made thinner. Thus, even if the members to be illuminated which are provided at the opposite sides of the dual surface illuminating device have relatively large surfaces, a uniform amount of light can be supplied to the entire surfaces.

Further, if the light from the linear light source is introduced only to either one of the first and second light introducing plates, the illumination light can be caused to further propagate only by either one of the first and second diffusing plates.

Further, a uniform amount of illumination light can be caused to further propagate from the first and second diffusing plates toward the outside.

Furthermore, the size of an apparatus provided with the inventive dual surface illuminating device can be made smaller, and the display and the film can be illuminated by a uniform amount of light.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A surface illuminating device comprising:
   a light source which generates a specified amount of light;
   a light introducing plate lying in a plane passing the light source;
   a first light diffusing plate arranged on a top surface of the light introducing plate; and
   a second light diffusing plate arranged on a bottom surface of the light introducing plate,
   wherein the light introducing plate includes a reflector plate having a reflective top surface and a reflective bottom surface.

2. A surface illuminating device according to claim 1, wherein the light introducing plate includes a first section arranged with the first light diffusing plate, and a second section arranged with the second light diffusing plate.

3. A surface illuminating device according to claim 2, wherein the light source faces a side of the light introducing plate, and the first and second sections each lie in parallel with the plane passing the light source.

4. A surface illuminating device according to claim 3, wherein the light source is linear.

5. A surface illuminating device according to claim 4, wherein the first section lies above the reflector plate and wherein the second section lies under the reflector plate.

6. A surface illuminating device according to claim 5, further comprising a light blocking member which is movable into at least a position to block light from the light source to one of the first and second sections of the light introducing plate.

7. A surface illuminating device according to claim 5, wherein each of the first and second sections of the light introducing plate is formed with serrations in a surface opposite to a surface arranged with its respective light diffusing plate.

8. A surface illuminating device comprising:
   a light source which generates a specified amount of light;
   a light introducing plate lying in a plane passing the light source;
   a first light diffusing plate arranged on a top surface of the light introducing plate; and
   a second light diffusing plate arranged on a bottom surface of the light introducing plate, wherein the light introducing plate includes a first section arranged with the first light diffusing plate and a second section arranged with the second light diffusing plate, and wherein the light source is arranged in an intermediate portion of the light introducing plate, the first section being disposed adjacent to one side of the light source and the second section being disposed adjacent to another side of the light source.

9. A surface illuminating device according to claim 8, wherein the light source is linear.

10. A surface illuminating device according to claim 8, wherein each of the first and second sections of the light introducing plate is formed with serrations in a surface opposite to a surface arranged with its respective light diffusing plate.

11. A surface illuminating device according to claim 8, further comprising a light blocking member which is movable into at least a position to block light from the light source to one of the first and second sections of the light introducing plate.

12. A surface illuminating device comprising:
    a light source which generates a specified amount of light;
    a light introducing plate lying in a plane passing the light source;
    a first light diffusing plate arranged on a top surface of the light introducing plate; and
    a second light diffusing plate arranged on a bottom surface of the light introducing plate, wherein the light introducing plate includes a first section arranged with the first light diffusing plate and a second section arranged with the second light diffusing plate, and wherein each of the first and second sections of the light introducing plate is formed with serrations in a surface opposite to a surface arranged with its respective light diffusing plate.

13. A surface illuminating device comprising:
    a light source which generates a specified amount of light;
    a light introducing plate lying in a plane passing the light source;
    a first light diffusing plate arranged on a top surface of the light introducing plate; and
    a second light diffusing plate arranged on a bottom surface of the light introducing plate, wherein the light introducing plate includes:
    a reflector plate having a reflective top surface and a reflective bottom surface;
    a first section arranged with the first light diffusing plate, the first section lying above the reflector plate; and
    a second section arranged with the second light diffusing plate, the second section lying under the reflector plate.

14. A surface illuminating device according to claim 1, wherein the light source is linear.

15. A film image reproducing apparatus comprising:
a surface illuminating device including:
- a light source which generates a specified amount of light;
- a light introducing plate lying in a plane passing the light source;
- a first light diffusing plate arranged on a top surface of the light introducing plate; and
- a second light diffusing plate arranged on a bottom surface of the light introducing plate;

a display panel which is arranged in such a position as to receive light from the first light diffusing plate;

a film image pickup device which is arranged in such a position as to receive light from the second light diffusing plate, and which picks up an image on a film using the light from the second light diffusing plate; and an image generator which displays an image picked up by the film image pickup device on the display panel.

16. An image recognizer for use with a photographing apparatus, comprising:
a surface illuminating device including:
- a light source which generates a specified amount of light;
- a light introducing plate lying in a plane passing the light source;
- a first light diffusing plate arranged on a top surface of the light introducing plate; and
- a second light diffusing plate arranged on a bottom surface of the light introducing plate;

a first display panel which is arranged in such a position as to receive light from the first light diffusing plate;

a second display panel which is arranged in such a position as to receive light from the second light diffusing plate; and an image generator which displays an image photographed by the photographing apparatus on the first and second display panels.

17. An illuminating method comprising the steps of:
entering light from a light source to a light introducing plate having a first surface facing in a first direction and a second surface facing in a second direction opposite to the first direction, the light introducing plate further including a reflector plate having a first specular reflecting surface facing in the first direction and a second specular reflecting surface facing in the second direction;

reflecting said light at the first specular reflecting surface and at the second specular reflecting surface; and sending out the light from the first and second surfaces of the light introducing plate while diffusing the light.

18. An illuminating method according to claim 17, wherein the light introducing plate includes a first section formed with the first surface, and a second section formed with the second surface.

19. A surface illuminating device according to claim 1, wherein the reflective top surface directs the light toward the first light diffusing plate, and wherein the reflective bottom surface directs the light toward the second light diffusing plate.

20. An illuminating method according to claim 17, further comprising the step of directing the light reflected by the first and second specular reflecting surfaces of the reflector plate toward the first and second surfaces of the light introducing plate, respectively, before sending out the light.

* * * * *